United States Patent [19]

Yang

[11] Patent Number: 4,662,444

[45] Date of Patent: May 5, 1987

[54] PROCESS FOR REDUCING POLYMER PLUGGING DURING POLYMER INJECTION INTO OIL RESERVOIR

[75] Inventor: Shan H. Yang, Tulsa, Okla.

[73] Assignee: Standard Oil Company, Chicago, Ill.

[21] Appl. No.: 724,121

[22] Filed: Apr. 17, 1985

[51] Int. Cl.$^4$ ............................................. E21B 43/22
[52] U.S. Cl. ................................. 166/274; 252/8.554
[58] Field of Search ..................... 252/8.55 D, 8.55 R; 166/274, 275

[56] References Cited

U.S. PATENT DOCUMENTS

| | | |
|---|---|---|
| 2,761,835 | 9/1956 | Brown ................................. 252/8.55 |
| 3,797,574 | 3/1974 | Feuerbacher et al. ............... 166/274 |
| 3,830,302 | 8/1974 | Dreher et al. ....................... 166/294 |
| 4,409,110 | 10/1983 | Borchardt et al. ................. 252/8.55 |
| 4,479,894 | 10/1984 | Chen et al. ......................... 252/8.55 |

*Primary Examiner*—Herbert B. Guynn

[57] ABSTRACT

Disclosed is a method of treating the wellbore area of an injection well to minimize polymer plugging around the wellbore during polymer injection. The treatment can be achieved by the injection of a dilute organic cation solution to the wellbore prior to the polymer injection and additionally having the cation present during the polymer injection. Data are shown that replacement of calcium, magnesium and sodium ions by the organic cation substantially reduce plugging.

6 Claims, 6 Drawing Figures

PROCESS FOR REDUCING POLYMER PLUGGING DURING POLYMER INJECTION INTO OIL RESERVOIR

BACKGROUND OF THE INVENTION

This invention relates to a wellbore treatment to minimize polymer plugging thereby permitting extended polymer injection in enhanced oil recovery processes. The process includes treatment with organic cation containing materials which exchange with inorganic ions on the rock in the formation which would otherwise interact with polymer. Representative ions include sodium, potassium, calcium, magnesium, etc.

The organic cation which interacts with the rock can have ammonium, pyridinium, sulfonium, or oxonium ion.

The general group of compounds included within this invention have previously been injected into rock formations for other purposes.

An example of this is Brown, U.S. Pat. No. 2,761,835 (1956), which was directed to the maintenance and/or restoration of permeability of clay containing rock to fluids and the use in a wellbore is shown. The reaction is quite different in that patent since the additive serves to reduce the swelling effect of water, water having a known ability to cause clays to swell. Clay can have cations in the base-exchange position or site including by way of example, sodium, potassium, calcium, magnesium, iron, hydrogen, etc. This patent suggests the treatment of the clay with primary, secondary, tertiary, and quaternary ammonium halides, the chloride being particularly identified.

Another example is Dreher, et al., U.S. Pat. No. 3,830,302 (1974), a patent directed to the reduction in the water-oil-ratio of producing wells. This reduction can be effected by injecting a polyacrylamide solution and a organic cation, e.g., alkyl trimethalamonium halide, a sulfonium compound or a pyridinium compound. Also disclosed is injecting the polymer with subsequent treatment with the cation containing compound.

Further, is Knox, et al., U.S. Pat. No. 3,794,117 (1974), which is directed to the treatment of sandstone formations with aqueous acid solutions. It is said that addition of a cationic nitrogen containing compound can be used to improve the penetration of the acid by reducing its effect near the wellbore.

The following are objects of this invention.

An object of this invention is to provide a new method for treating wellbores to reduce polymer formation plugging. In a more specific aspect, an organic cation containing material is injected into the formation to exchange with inorganic ions on the rock surface which would otherwise interact with the polymer and cause plugging.

Other objects and advantages of this invention will be apparent to one skilled in the art upon reading this disclosure.

SUMMARY OF THE INVENTION

Broadly, my invention resides in the method of treating the area adjacent an injection well to minimize polymer plugging around the wellbore during polymer injection comprising injecting a dilute aqueous solution containing an organic cation containing carbon chain substitution, said organic cation being selected from the group consisting of ammonium, sulfonium, oxonium, and pyridinium cations, and injecting an aqueous solution of a polymer into said well.

As one group of compounds within this broad statement are those wherein said cation is ammonium containing primary, secondary, tertiary or quaternary substitution having the structure where
(1) when said substitution is primary, $R_1$ is a carbon chain containing 1 to 20 carbon atoms and $R_2$, $R_3$ and $R_4$ are hydrogen atoms,
(2) when said substitution is secondary, $R_1$ is a carbon chain containing 1 to 3 carbon atoms, $R_2$ is a carbon chain containing 1 to 15 carbon atoms, and $R_3$ and $R_4$ are hydrogen atoms,
(3) where said substitution is tertiary, $R_1$ and $R_2$ are carbon chains containing 1 to 3 carbon atoms, $R_3$ is a carbon chain containing 1 to 15 carbon atoms, and $R_4$ is a hydrogen atom, and
(4) where said substitution is quaternary, $R_1$ and $R_2$ are carbon chains containing 1 to 3 carbon atoms, and $R_3$ and $R_4$ are carbon chains containing a sum of 2 to 20 carbon atoms, and
Y is a halide or acetate anion.

In another aspect, the invention resides in the use of compounds wherein said cation is sulfonium containing primary, secondary, or tertiary substitution having the structure where
(1) when said substitution is primary, $R_1$ is a carbon chain containing 1 to 20 carbon atoms, and $R_2$ and $R_3$ are hydrogen atoms,
(2) when said substitution is secondary, $R_1$ and $R_2$ are carbon chains containing 1 to 10 carbon atoms, and $R_3$ is a hydrogen atom, and
(3) when said substitution is tertiary, $R_1$ and $R_2$ are carbon chains containing 1 to 3 carbon atoms, and $R_3$ is a carbon chain containing 1 to 20 carbon atoms, and
Y is a halide or acetate anion.

In another aspect, a group of compounds suitable for my invention are those wherein the cation is oxonium containing primary, secondary, or tertiary substitution having the structure where
(1) when said substitution is primary, $R_1$ is a carbon chain containing 1 to 20 carbon atoms, and $R_2$ and $R_3$ are hydrogen atoms, (2) when said substitution is secondary, $R_1$ and $R_2$ are carbon chains containing 1 to 10 carbon atoms, and $R_3$ is a hydrogen atom, and (3) when said substitution is tertiary, $R_1$ and $R_2$ are carbon chains containing 1 to 3 carbon atoms, and $R_3$ is a carbon chain containing 1 to 20 carbon atoms, and Y is a halide or acetate anion.

Finally, a group of compounds suitable for this invention are those where the cation is pyridinium having the structure where $R_1$ is hydrogen or a carbon chain and (1) when $R_1$ is hydrogen, $R_2$ is a carbon chain containing 1 to 14 carbon atoms, and (2) when $R_1$ and $R_2$ are carbon chains, the sum of carbon atoms in $R_1$ and $R_2$ being 1 to 14, and Y is a halide or acetate anion.

Fairly dilute solutions of these additives can be used quite effectively. I believe that they will find their greatest use where the concentration is in the amount of 0.01 to 10 wt% of the cation compound as the halide or acetate. Higher concentrations can be used.

Examples of suitable organic cation containing materials are shown in the following table.

TABLE

Salts of Organic Cations ethylammonium chloride
t-butylammonium chloride
n-hexylammonium chloride
3-ethylheptylammonium chloride
1,3-heptadienyl-ammonium acetate
coco ammonium chloride
tallow ammonium chloride
soya ammonium chloride
eicosylammonium acetate
o-octylphenylammonium chloride
N-methyl-butylammonium chloride
N-methyl-4-octylbenzylammonium chloride
N-methyl-cetylammonium chloride
N-ethyl-nonylammonium chloride
N-methyl-pentadecenyl-ammonium acetate
N,N-dimethyl-hexylammonium chloride
tripropylammonium chloride
N,N-dimethyl-tetradecylammonium chloride
N,N-dimethyl-hydrogenated-tallow ammonium chloride
N,N-dimethyl-butadecylammonium chloride
tetra-n-propylammonium chloride
N,N,N-trimethyl-octadecylammonium chloride
N,N-dimethyl-N-ethyl-2-decene-ammonium chloride
N,N,N-trimethyl-coco ammonium chloride
N,N-dimethyl-N,N-diamylammonium acetate
N,N,N-trimethyl-t-butylphenylammonium acetate
N,N,N-trimethyl-octadecylammonium chloride
t-octylpyridinium acetate
1-methyl-4-dodecylpyridinium chloride
S,S-dimethyl-dodecylsulfonium chloride
S-ethyl-decylsulfonium acetate
octylsufonium chloride
S-methyl-t-hexylphenylsulfonium chloride
O-methyl-hexyloxonium chloride
O,O-dimethyl-hexadecyloxonium chloride While I have shown chlorine as the halogen, it is obvious that the corresponding bromide or iodide could be used.

The polymer being injected can be anyone of those normally used in the industry today. One group of these are the polysaccharides of which Xanthan gum is a representative example. Polyelectrolytes constitute another broad class of polymers and specific examples include the partially hydrolyzed high molecular weight polyacrylamides, copolymers of acrylamide and sodium acrylate or acrylic acid. These compounds are widely supplied to the industry by a number of suppliers. When an ionic polymer such as partially hydrolyzed polyacrylamide is used, the carbon chain substitution in the sale of the organic cation should be, preferably, limited to a maximum of 12. Review of the list of specific compounds mentioned above will show that mixtures of alkyl groups and alkenyl groups can be present in the salt. An example is the cocoammonium chloride mentioned which is commercially available as Arquad C-50. This is said to contain, by weight, about 50% quaternary ammonium salt, about 1% sodium chloride, about 30% isopropanol and about 13% water. The quaternary ammonium salt portion is said to have the following alkyl moiety distribution: octyl, about 8%, decyl, about 9%, dodecyl, about 47%, tetradecyl, about 18%, hexadecyl, about 8%, and octadecyl and octadecenyl, about 5% each.

Obviously, if the salt is only present in an amount of 50% of the mixture, the amount set forth above should be adjusted to give the amount needed as the active ingredient.

Hexylammonium chloride, as will be seen from the examples, is the presently preferred material.

The amount of solution containing the organic cation injected should be sufficient to contact the reservoir at least 5, and preferably 10, feet around the wellbore. One, and preferably two, pore volumes of the treating solution will be effective in reducing polymer plugging. Larger amounts can be used if the economics justify.

As another aspect of the invention, some of the organic cation salt can be added to the polymer as it is injected, this preventing leaching of the organic cation from the rock. Further, a mixture of the salt and polymer can be injected periodically during the injection process.

BRIEF DESCRIPTION OF THE DRAWING

The figures accompanying and forming a part of the invention illustrate the data which demonstrate its effectiveness.

DETAILED DESCRIPTION OF THE INVENTION

The following example set forth certain preferred embodiments of my invention but, as will be obvious, should not be considered as unduly limiting.

EXAMPLE 1

Figure 1:
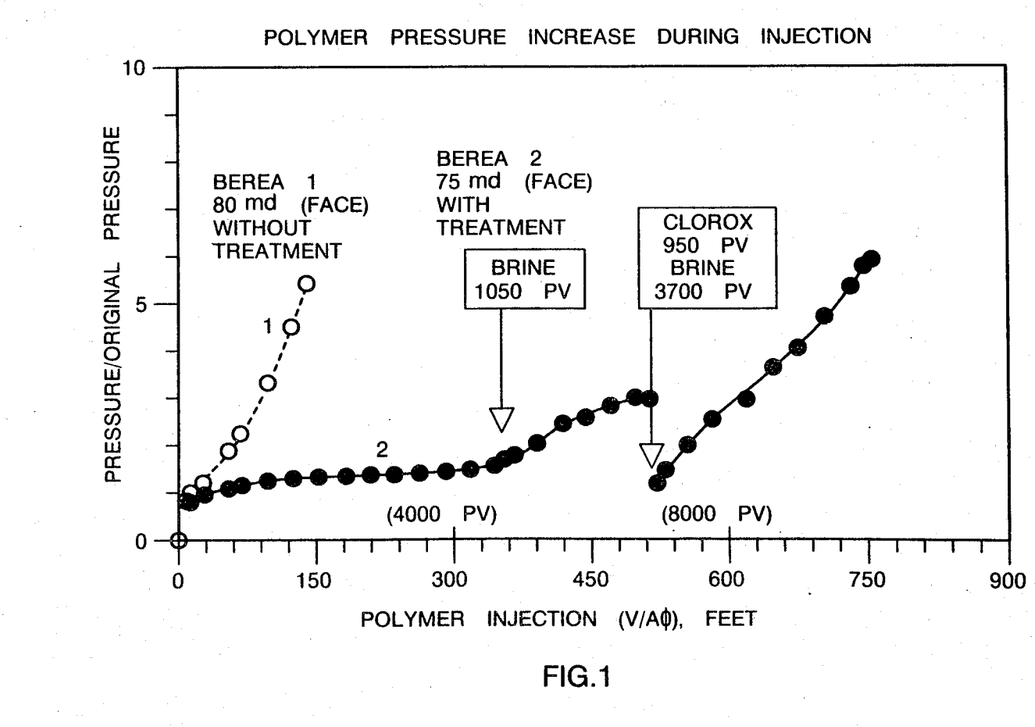
FIGS. 1 and 2 are face (front to center) section and body (center to end) section, respectively, pressure increase as polymer was introduced into the core with and without hexylammonium chloride treatment.
Figure 2:
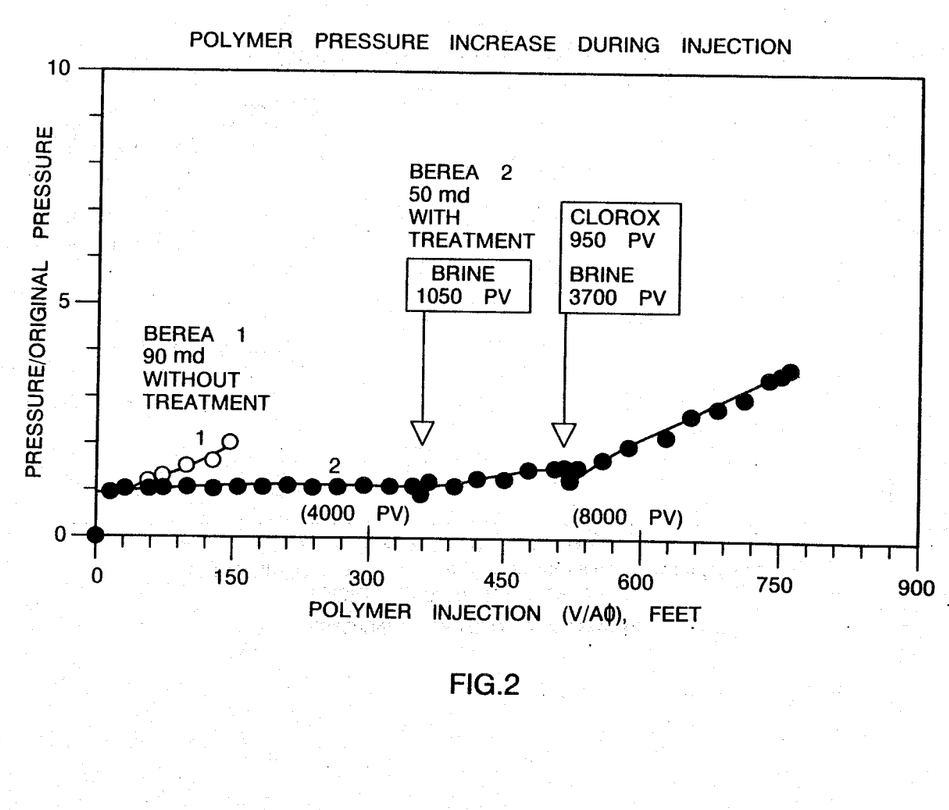

This example demonstrates the effectiveness of the treatment according to my invention. Two Berea sandstone cores having a diameter of ¼ in., a length of 0.9 in., and a pore volume of 0.1 cc were placed in the test apparatus with taps in middle and the front end so that it was possible to measure the pressure at the face and body sections. In the face section, the first core had a permeability of 80 millidarcies while the second had a permeability of 75 millidarcies. A solution of partially hydrolyzed polyacrylamide was prepared for injection into both cores. The polymer was Cyanamid Cyanatrol 950, a 30% hydrolyzed polymer, with $NH_4+$ as the cation. The concentration of polymer in the solution was 1200 ppm. The solution was sheared in a Waring blender (set at 30 volts) for 20 seconds after preparation. The viscosity of the sheared solution was 7.4 centistokes. The sheared polymer solution was filtered through a two micron Balston filter before injection into the core. The apparatus was metal free. The first core contained no pretreatment while the second was pretreated with an aqueous solution of 1% by weight hexylammonium chloride prior to polymer injection. Injected were 12 cc. This amount was dictated by the equipment used and is an excess over that needed in commercial operation. The pressure increase as a function of actual pressure measured at the face or body divided by the original pressure. The first core showed severe polymer plugging at the injection of 2000 PV. These data are reported as the open circles in FIGS. 1 and 2. The horizontal scale on figures showing pressure increase in feet where V is volume injected, A is cross section of the core and $\phi$ is porosity of the core. Note that the pressure of the untreated core increased sixfold at the face section. The second core having the pretreatment with hexylammonium ions showed substantially no pressure buildup at the 4800 PV injection level. The black circles represent the pressure increase. In this case, the heylammonium ions stayed on cation exchange sites in the core replaced the natural sodium, magnesium and calcium ions during the pretreatment.

To confirm that the hexylammonium ions were the effective material, at about 4800 PV, a large bank of fresh brine was injected and the pressure increased three-fold during the subsequent pore volume injection. It is believed that this treatment partially removed the hexylammonium ions from the core. To confirm this once again, a 1.5% by weight sodium hypochlorite solution was injected with a large bank of fresh brine. Consequently, the pressure increased sixfold at the polymer injection of an additional 4000 PV. The treatment with the sodium hypochlorite completely removed the hexylammonium cation and the plugging in the final portion of the curves of FIGS. 2 and 3 approximate the numbers obtained in the injection process of the core receiving no pretreatment.

EXAMPLE 2

Figure 3:
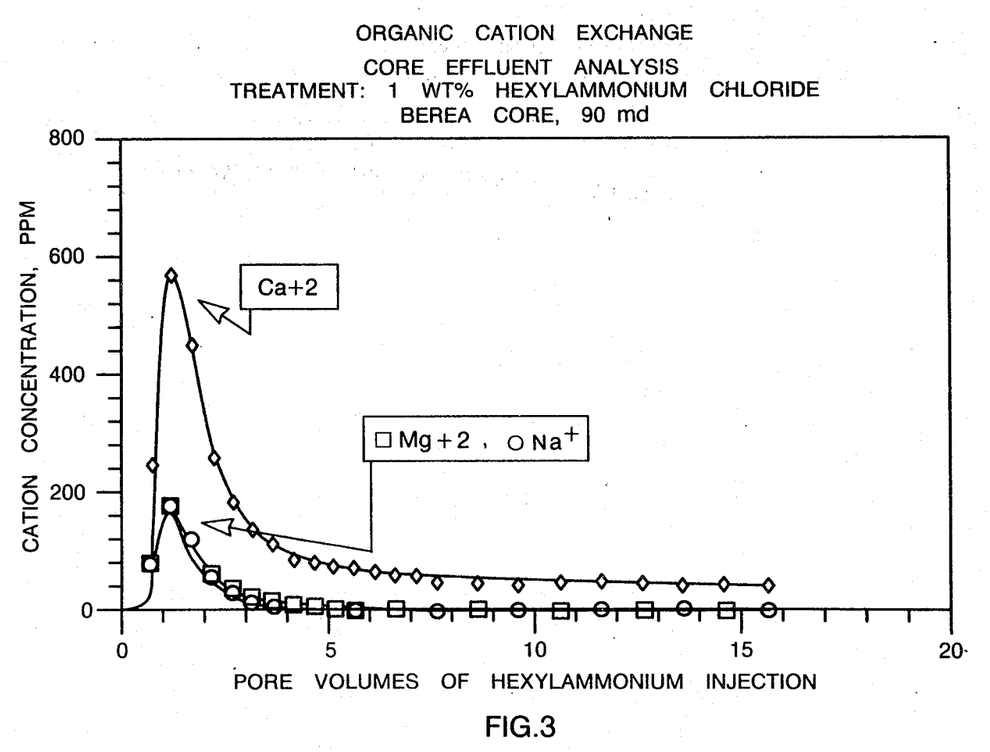
FIG. 3 illustrates a measurement of the naturally occurring calcium, magnesium, and sodium ions which were exchanged into the core effluent by adding the organic cation salt, the squares showing magnesium and the circles representing sodium.
Figure 4:
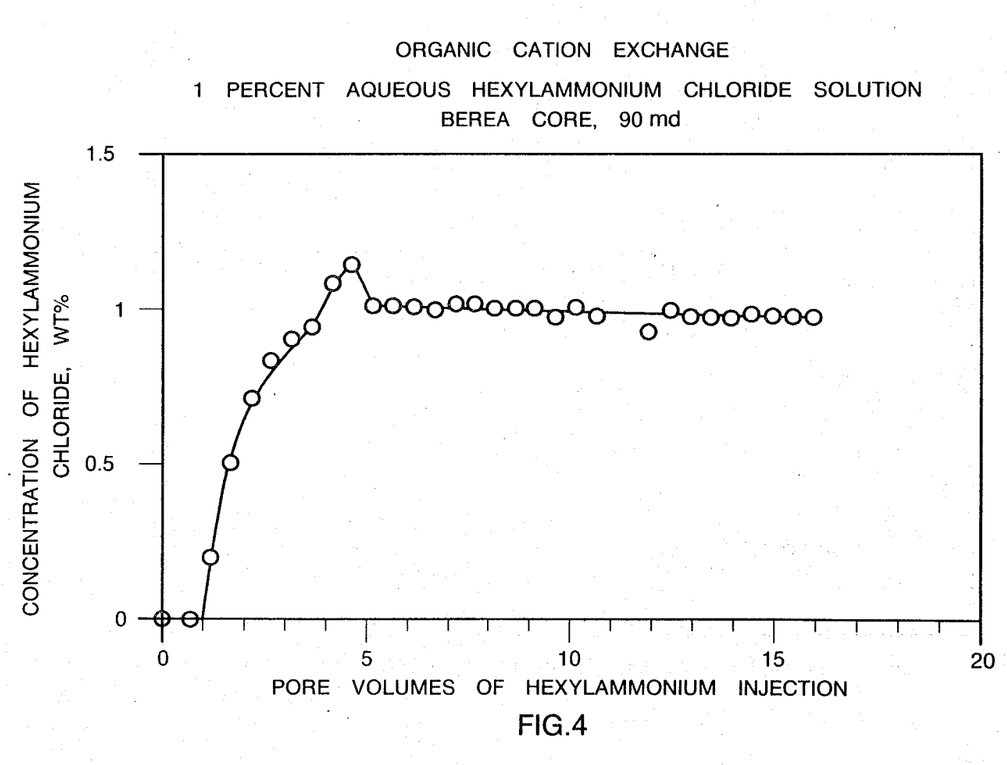
FIG. 4 shows the intake of the alkyl ammonium cations.

This example illustrates that the bonding of the organic cations to the Berea core occurs through a cation exchange process. FIGS. 3 and 4 indicate the data obtained in this work. Here the Berea core had a diameter of 1 in., a length of 1 in. and a pore volume of 2.4 $cm^3$. An aqueous solution of 1% by weight hexylammonium chloride was injected into the core at 2.4 $cm^3$ per hour. Core effluents were analyzed. FIG. 3 shows that the calcium, magnesium and sodium appeared to a great extent in the initial stages of core effluent measurement. The magnesium ion concentration is shown by the squares and the circles represent the sodium.

The intake of hexylammonium ions by the core is shown in FIG. 4. The calculation of the concentration of calcium, magnesium, and sodium ions in the core effluents shows that the cation exchange capacity is approximately 60 milliequivalents per liter of the pore volume.

These figures and the data in FIGS. 3 and 4 show that the cation exchange sites of the core were occupied by the inorganic cations. These cations have strong interactions with the electron donating groups of the polymer. This interaction worsens the excessive polymer buildup in the core which occurs through a mechanical filtration process.

When the cation exchange sites of the core are occupied by organic cations, the hydrocarbons on the organic cations do not exert much interaction with the polar or anionic polymers. Therefore, buildup of polymer in the pore thoats is minimized.

EXAMPLE 3

Figure 5:
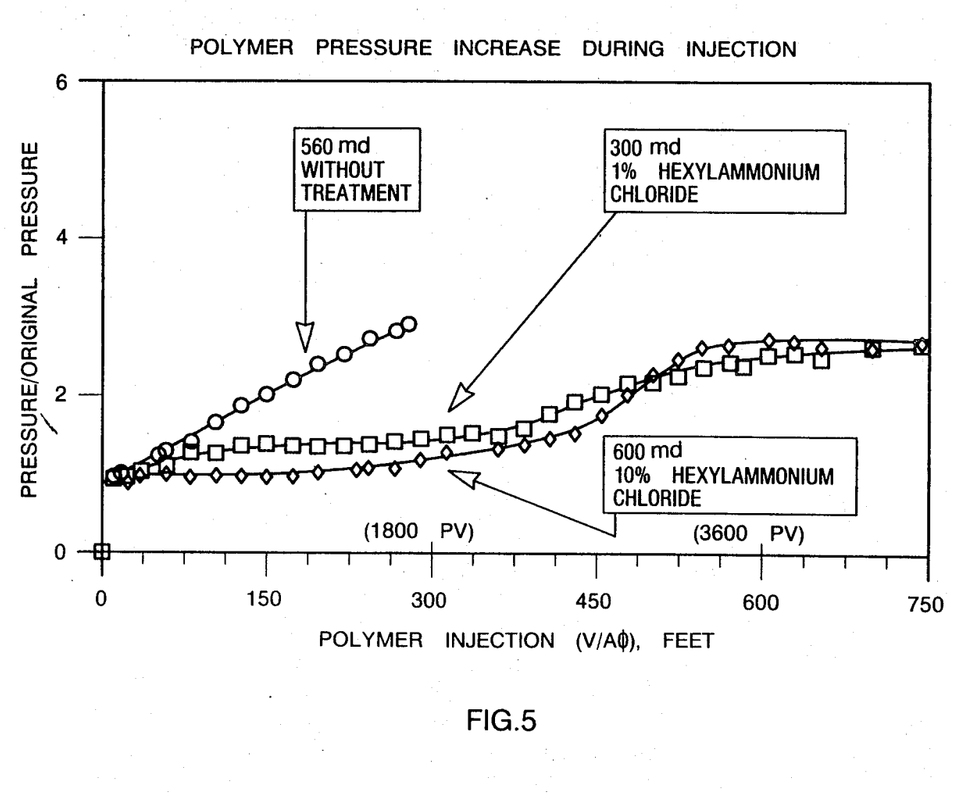
FIG. 5 shows polymer injection causing pressure buildup with three Berea sandstone cores with and without treatment.

Directing attention to FIG. 5, it will be seen that substantially the same effect is found with more porous cores. The three Berea cores used in this example had a diameter of ¼ in. and a length of 2 in. This represents the measurements taken across the whole core. The 560 md core without pretreatment increased in pressure approximately threefold at slightly more than 4000 PV of the polymer solution of Example 1. A tighter core having a permeability of 300 md did not show this buildup for a long period of time. The squares represent the treatment with a 1% solution of hexylammonium chloride while the squares represent the treatment of a 600 md core with a pretreatment of 10% by weight aqueous solution of hexylammonium chloride. The cores with the 1% or 10% hexylammonium chloride treatment showed negligible plugging for 2700 PV of polymer injection. Thereafter, the polymer resistance to flow became somewhat greater, but leveled out at approximately 4500 PV.

EXAMPLE 4

Figure 6:
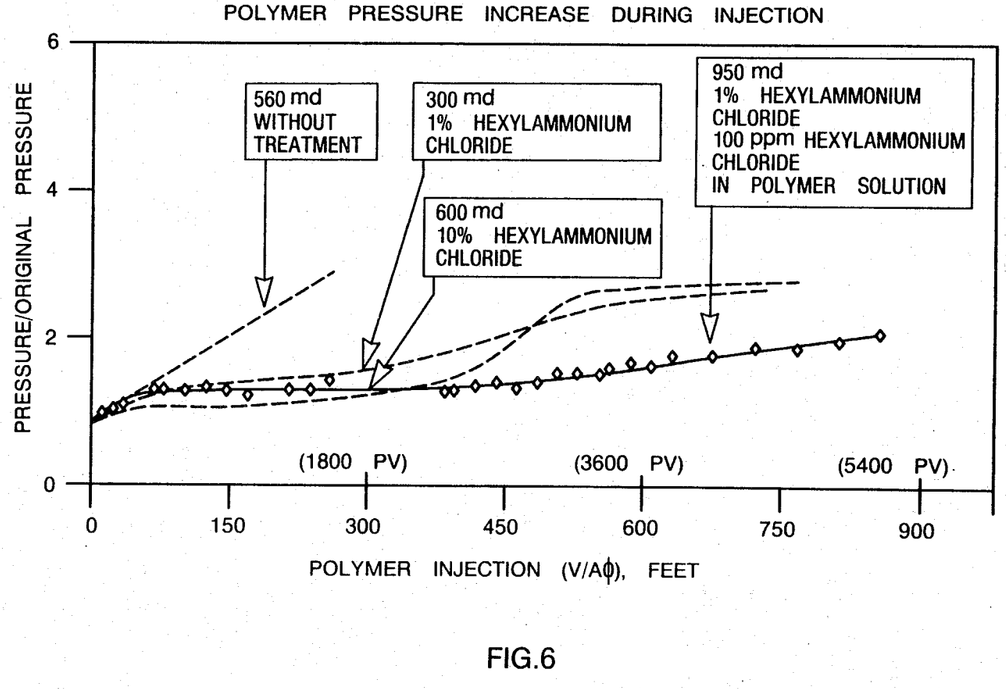
FIG. 6 illustrates the improved effect of injecting a polymer containing an organic cation salt, this figure having the material of FIG. 5 shown repeated in dotted lines.

FIG. 6 reproduces the curves of FIG. 5 as shown in dotted lines with one solid line being added. This illustrates the continued improvement of using 100 ppm hexylammonium chloride in the partially hydrolyzed polyacrylamide polymer solution.

EXAMPLE 5

The process of this invention was used in a midcontinent field having a reservoir with a pay zone of 17 ft, the rock having a porosity of 24%. The penetration was 10 ft. Two pore volumes were used of an aqueous solution containing 1 wt% hexylammonium chloride. The total volume of solution injected was 1370 bbls/well.

While illustrative embodiments of my invention have been set forth, it will be apparent to those skilled in the art that considerable modification can be made without departing from the scope of the invention.

I claim:

1. A method of minimizing polymer plugging in a hydrocarbon containing subterranean formation adjacent an injection well prior to the injection of an aqueous polymer solution for displacing the hydrocarbons comprising injecting an aqueous solution containing an effective amount of at least one of the organic cation containing compounds having the following structures:

where:
(1) $R_1$ is a carbon chain containing 1–20 carbon atoms, and $R_2$ and $R_3$ are hydrogen atoms, or
(2) $R_1$ and $R_2$ are carbon chains containing 1–10 carbon atoms, and $R_3$ is a hydrogen atom, or
(3) $R_1$ and $R_2$ are carbon chains containing 1–3 carbon atoms, and $R_3$ is a carbon chain containing 1–20 carbon atoms, and Y is a halide or acetate anion;

where:
(1) $R_1$ is a carbon chain containing 1–20 carbon atoms, and $R_2$ and $R_3$ are hydrogen atoms, or
(2) $R_1$ and $R_2$ are carbon chains containing 1–10 carbon atoms, and $R_3$ is a hydrogen atom, or
(3) $R_1$ and $R_2$ are carbon chains containing 1–3 carbon atoms, and $R_3$ is a carbon chain containing 1–20 carbon atoms, and Y is a halide or acetate anion;

wherein $R_1$ is hydrogen or a carbon chain and
(1) when $R_1$ is a hydrogen, $R_2$ is a carbon chain containing 1–14 carbon atoms and
(2) when $R_1$ and $R_2$ are carbon chains the sum of the carbon atoms in $R_1$ and $R_2$ being 1–14, and Y is a halide or acetate anion.

2. The method of claim 1 wherein said aqueous solution containing an effective amount of at least one of the organic cation containing compounds contains at least 0.01 wt% of organic cation containing compound as the halide or acetate.

3. The method of claim 1 wherein the halide is a chloride.

4. The method as recited in claim 1 wherein the aqueous solution of polymer additionally contains aqueous solution containing an effective amount of at least one of the organic cation containing compounds.

5. A method of minimizing polymer plugging in a hydrocarbon containing subterranean formation adjacent an injection well prior to the injection of an aqueous polymer solution for displacing the hydrocarbons comprising injecting an aqueous solution containing an effective amount of hexylammonium chloride.

6. The method of claim 5 wherein said aqueous polymer solution additionally contains hexylammonium chloride.

* * * * *